(No Model.)

J. C. GUNN.
FRUIT DRIER.

No. 331,294. Patented Dec. 1, 1885.

WITNESSES

INVENTOR
John C. Gunn,
By C. A. Snow & Co.
his Attorneys.

UNITED STATES PATENT OFFICE.

JOHN C. GUNN, OF KNOXVILLE, TENNESSEE, ASSIGNOR OF ONE-HALF TO HENRY N. SAXTON, JR., OF SAME PLACE.

FRUIT-DRIER.

SPECIFICATION forming part of Letters Patent No. 331,294, dated December 1, 1885.

Application filed July 16, 1885. Serial No. 171,762. (No model.)

*To all whom it may concern:*

Be it known that I, JOHN C. GUNN, a citizen of the United States, residing at Knoxville, in the county of Knox and State of Tennessee, have invented a new and useful Improvement in Fruit and Vegetable Driers, of which the following is a specification, reference being had to the accompanying drawings.

My invention relates to an improvement in fruit and vegetable driers; and it consists in the peculiar construction and combination of devices, that will be more fully set forth hereinafter, and particularly pointed out in the claims.

Figure 1:
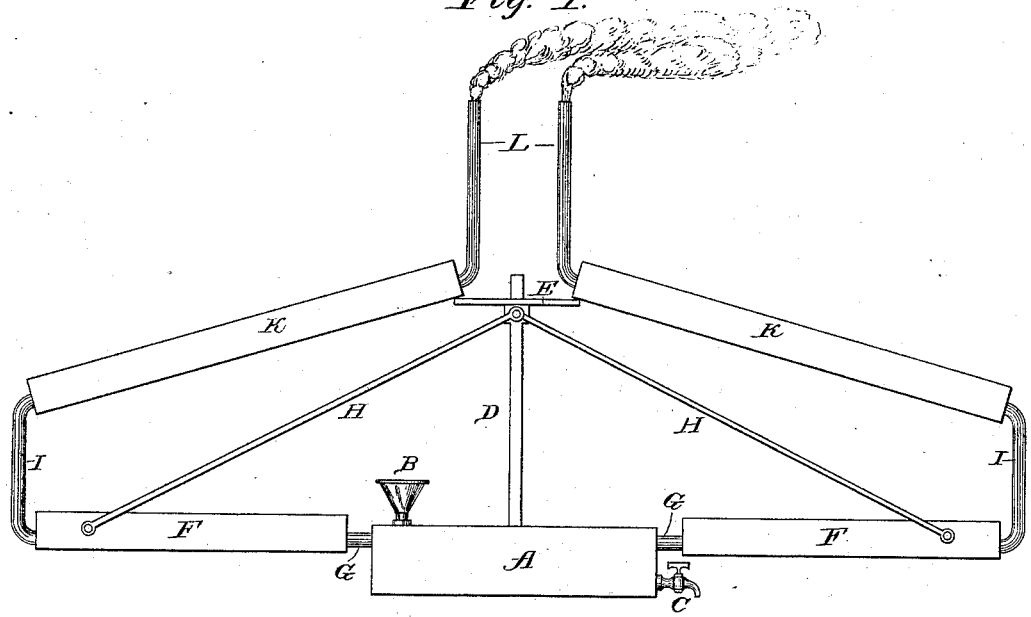
Figure 2:
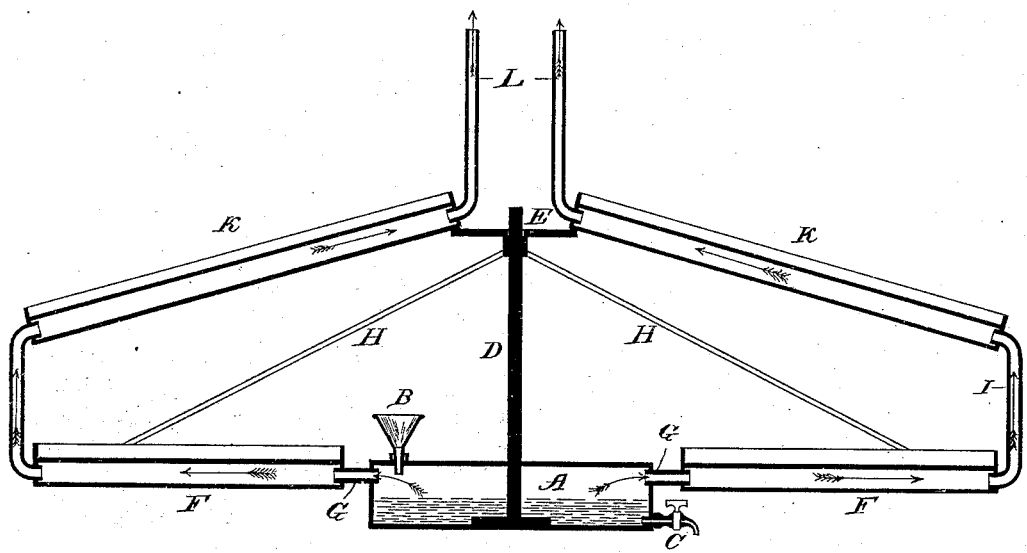

In the accompanying drawings, Figure 1 is a side elevation of my invention. Fig. 2 is a vertical sectional view of the same.

A represents a steam-generator, which consists of a suitable flat rectangular vessel, having a filling-funnel, B, and a draw-off faucet, C. From the center of this generator rises a vertical standard, D, which is provided near its upper end with a transverse plate, E. End pans, F, are joined to the generator A by means of connecting-pipes G, and these end pans are supported in a horizontal position by means of the brace-rods H, which are secured to them near their outer ends, and to the upper ends of the standard D, as shown.

U-shaped pipes I are connected to the outer sides of the end pans, F, and to inclined pans K, the upper ends of which pans K rest upon the outer edges of the plate E. From the upper ends of the inclined pans K extend the blow-off pipes L. It will be seen that this construction gives ample space between the upper ends of the pans K to facilitate the lifting and handling of said pans when the machine is in use. The steam from the generator passes through the pipes G into the pans F, and from thence through the U-shaped pipes I into the inclined pans K.

The fruits and vegetables to be dried are placed on the upper sides of the pans, and the generator is partly filled with water and placed upon the stove, range, or other suitable heater. The steam which condenses in the pans finds its way back to the generator.

The means herein described for securing the pans to the generator prevent the pans from sagging from the ends of the generator and render the drier very compact and facilitate handling the fruit or vegetables that are being dried.

Having thus described my invention, I claim—

1. The combination of the generator having the vertical central standard, D, the pans F, connected to and arranged on opposite sides of the generator and communicating therewith, and the brace-rods H, connected to the standard and to the pans for maintaining the latter in a horizontal position, and approximately in the same plane with the generator, substantially as described.

2. The combination of the generator A, the pans F, connected to opposite sides of the generator, communicating therewith and supported in a horizontal position, and the inclined pans K, communicating with the pans F and supported above the latter, substantially as described.

3. The combination of the steam-generator A, having the central vertical standard, D, the horizontal pans F on opposite sides of the generator and communicating therewith, and the inclined pans K above the pans F, communicating with the latter at their outer sides, the inner sides of pans K being supported by the standard D, substantially as described.

4. The generator A, in combination with the pans F, connected thereto, the standard D, having plate E, the inclined pans K, resting on the plate, and the pipes I, connecting the pans F K, as set forth.

In testimony that I claim the foregoing as my own I have hereto affixed my signature in presence of two witnesses.

JOHN C. GUNN.

Witnesses:
 JNO. W. GREEN,
 WM. W. LEE.